(12) United States Patent
Chelf et al.

(10) Patent No.: US 7,340,726 B1
(45) Date of Patent: Mar. 4, 2008

(54) SYSTEMS AND METHODS FOR PERFORMING STATIC ANALYSIS ON SOURCE CODE

(75) Inventors: Benjamin E. Chelf, Palo Alto, CA (US); Seth A. Hallem, San Francisco, CA (US); Andy C. Chou, San Francisco, CA (US)

(73) Assignee: Coverity, Inc., San Francisco, CA (US)

( * ) Notice: Subject to any disclaimer, the term of this patent is extended or adjusted under 35 U.S.C. 154(b) by 804 days.

(21) Appl. No.: 10/637,453

(22) Filed: Aug. 8, 2003

(51) Int. Cl.
*G06F 9/45* (2006.01)
*G06F 11/00* (2006.01)

(52) U.S. Cl. .................. 717/126; 717/141; 714/38

(58) Field of Classification Search ............... 717/126, 717/141; 714/37
See application file for complete search history.

(56) References Cited

U.S. PATENT DOCUMENTS 5,960,202 A * 9/1999 Granston et al. ........... 717/141

OTHER PUBLICATIONS

"Installing Smatch!!!", Oct. 11, 2002 [online], accessed Dec. 19, 2006, retrieved from Internet <URL: <http://web.archive.org/web/20021011112904/http://smatch.sourceforge.net/installing.html> (1 page).*
"Smatch!!!", Apr. 4, 2003 [online], accessed Dec. 19, 2006, retrieved from Internet <URL: http://web.archive.org/web/20030404041020/http://smatch.sourceforge.net/>, (3 pages).*
"Smatch Intermediate Code Representation!!!", Oct. 11, 2002 [online], accessed Dec. 19, 2006, retrieved from Internet <URL: http://web.archive.org/web/20021011071814/http://smatch.sourceforge.net/intermed.html> (3 pages).*
"Using Smatch!!!", Apr. 13, 2003 [online], accessed Dec. 19, 2006, retrieved from Internet <URL: http://web.archive.org/web/20030413091737/http://smatch.sourceforge.net/usingSmatch.html>, (2 pages).*
"Using smatch.pm!!!", Jul. 15, 2003 [online], accessed Dec. 19, 2006, retrieved from Internet <URL: http://web.archive.org/web/20030715162055/http://smatch.sourceforge.net/coding.html> (5 pages).*

* cited by examiner

*Primary Examiner*—Eric B. Kiss
(74) *Attorney, Agent, or Firm*—G. Victor Treyz

(57) ABSTRACT

Systems and methods are provided for performing static error analysis on source code. A computer system having an operating system may contain a number of source code files. During a normal build process, a build program may be used to set various compilation options and to invoke appropriate compilers that compile the source code files into executable code. Static analysis debugging tools may be used to perform static analysis on the source code files. The appropriate static analysis tools may be invoked using a static analysis tool management program. Directory, path and name modification may be used to invoke the analysis tools. A monitoring program may be used to determine how to invoke the tools. The operating system may be modified so that the static analysis tools are invoked in place of the compilers when the build program is run.

18 Claims, 8 Drawing Sheets

SYSTEMS AND METHODS FOR PERFORMING STATIC ANALYSIS ON SOURCE CODE

BACKGROUND OF THE INVENTION

This invention relates to software debugging, and more particularly, to static error analysis for complex software environments.

Software code often contains errors. Some of these errors are easily detected by visual inspection of the printed code. More subtle errors are typically only discovered with the help of software debugging tools.

Dynamic software debugging tools perform run-time error checking. Software errors may be captured as they occur. For example, if control branches down a particular path in the program, an error (e.g., an out-of-bounds memory access) that occurs along that path may be detected. Although dynamic analysis tools are often invaluable in the debugging process, they are not without shortcomings. In particular, it may be difficult to exercise complex software thoroughly during testing. For example, in particularly large programs, it may only be possible to rigorously test about 5-10% of all possible program behaviors before the software is released to end users. Rarely used portions of the software (e.g., rarely-traveled paths in conditional branches) may never be tested before the software is deployed in the field. Dynamic tools have the additional drawback that they slow down the program being analyzed and consume more memory resources. Therefore, dynamic tools are not useful in debugging the real-time behavior of deployed software.

Static analysis debugging tools operate on static code (i.e., code that is not running during the analysis process). Static analysis tools make certain simplifying assumptions in order to make the analysis of the software practical. Because of such simplifications, static analysis tools are not able to detect all conceivable potential errors. Nevertheless, static analysis tools can detect errors that are often missed when using dynamic analysis tools alone. For example, static analysis may detect an illegal operation that is contained in a rarely traversed or otherwise hard-to-test conditional branch path. Because the path is so rarely visited during operation of the software, this error might not be detected using a dynamic analysis tool.

In modern software development environments, source code, compilers, and ancillary software components are often distributed across many different directories and systems.

As a result of this complexity, software developers typically use build management utilities such as the "Make" program to assist in the process of building executable code. Software developers also construct their own build management utilities (e.g., by writing customized shell scripts). As the software development environment at a given organization matures, it is commonplace for the overall software build process used by that organization to involve many directory changes, variable assignments, calls of different build management utilities, etc.

The use of static analysis debugging tools in this type of complex build environment is difficult. Static analysis software tools operate on source code, so all of the relevant source code to be debugged must be identified. Different static analysis tools may be used in place of different compilers, so it may be necessary to identify which compilers are normally used to compile which source code files during the build process. Although it may be possible for the proper static analysis tools to be selected and invoked manually, this process can be time consuming and prone to errors, particularly when it is necessary to set up and run a new suite of static analysis tools in a relatively short period of time in a complex build environment.

It is therefore an object of the present invention to provide improved ways in which to invoke static error analysis on source code, particularly in complex software development environments.

SUMMARY OF THE INVENTION

Systems and methods are provided for analyzing source code on a computer system. Static analysis tools may be used to perform static error analysis on source code files. The static analysis tools may produce error reports or other suitable results that identify errors and potential problems that have been detected in the source code. Different static analysis tools may be used for source code files in different languages.

During a normal executable code build process, a build program is used to invoke appropriate compilers to compile the source code files. The source code files may be in different languages, so in general the build program invokes compilers suitable for compiling source code files in different languages.

The build program may call a number of build management utility programs. These programs may be obtained from commercial sources or may be written by in-house software developers.

The build program and build management utilities and files associated with these programs are used to establish various compilation options or settings for use when compiling the source code with the compilers. The options may include information such as which architecture to compile for, how much to optimize the executable code, what types of syntax errors to report, etc. Some of the compilation options may be proprietary to particular compilers or operating environments. Accordingly, these options may not be recognized by the static analysis tools. A user of the computer system (e.g., a software developer or other user) may be provided with an opportunity to identify which compilation options are to be ignored by the static analysis tools during the static analysis process. In addition, a user of the computer system may be provided with an opportunity to identify compiler options that are to be used that are different than those used during normal compilation operations. As an example, normal compiler operations may generate a fairly large number of warnings. An additional compiler option that suppresses all warnings may be required by the static analysis tool. Use of this additional compiler option (to suppress warnings) may reduce the size of the output. A user of the computer system may therefore be provided with an opportunity to identify additional compilation options that are to be used when the static analysis tools are invoked. Information may also be obtained from the user that identifies which compilers are used by the system during the normal build process.

To perform static analysis, the appropriate static analysis tools are invoked. During invocation of the static analysis tools, the information from the user on the compilers that are normally used and the compilation options that should be used (e.g., ignored or added) by the static analysis tools may be used to ensure that the static analysis tools function properly.

A static analysis tool management program may be used to invoke the appropriate static analysis tools. During the build process, the build program produces a build program output, which records a log of the operations performed by the build program. This output can be captured for use by the static analysis tool management program. For example, the build program output may be directed to a file that is used as an input by the static analysis tool management program.

During operation, the static analysis tool management program invokes the proper static analysis tools, runs those tools on the source code to be analyzed, and uses the build program output to ensure that the appropriate tools are run in the appropriate directories, ensure that the appropriate compilation options are ignored and/or added, and ensure that the resulting static analysis results are saved (e.g., in an appropriate database on the computer system).

If desired, a second type of static analysis management program, a monitoring (trace) program, may be used to monitor the build program interactions with the operating system rather than relying on the build program output. The monitoring program can determine which compilers are called in which directories, and which compiler options are used. The monitoring program can also identify which source code is compiled. Because some of the commands used by the build program may be incompatible with the operation of the static analysis tools or may not be needed by the tools, the information that is gathered by the monitoring program may be filtered (e.g., by a filter program or a monitoring and filtering program). The filtered build program output that is produced may be used to run a version of the build program where the static analysis tools have been substituted for respective compilers. This causes the static analysis tools to perform static analysis on the source code files.

The appropriate static analysis tools can be invoked by redefining operating system functions. For example, operating system process creation and execution functions such as "Fork" and "Exec" may be modified by instructing the operating system to load a modified version of these functions. If desired, a new operating system kernel module may be provided to the computer system. The kernel module may contain the modified functions.

When the operating system has been modified in this way, running the build program causes the static analysis tools to be invoked in place of the compilers that are usually used to compile the source code. Information may be gathered from users on which compilers are used by the system and which compilation options should be ignored by the static analysis tools or should be added by the static analysis tools during static analysis. This user-specified information may be used when the build program is run to ensure that options that are not understood by the static analysis tools can be ignored and options that are helpful (e.g., options to suppress unwanted warning-generation) may be included.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
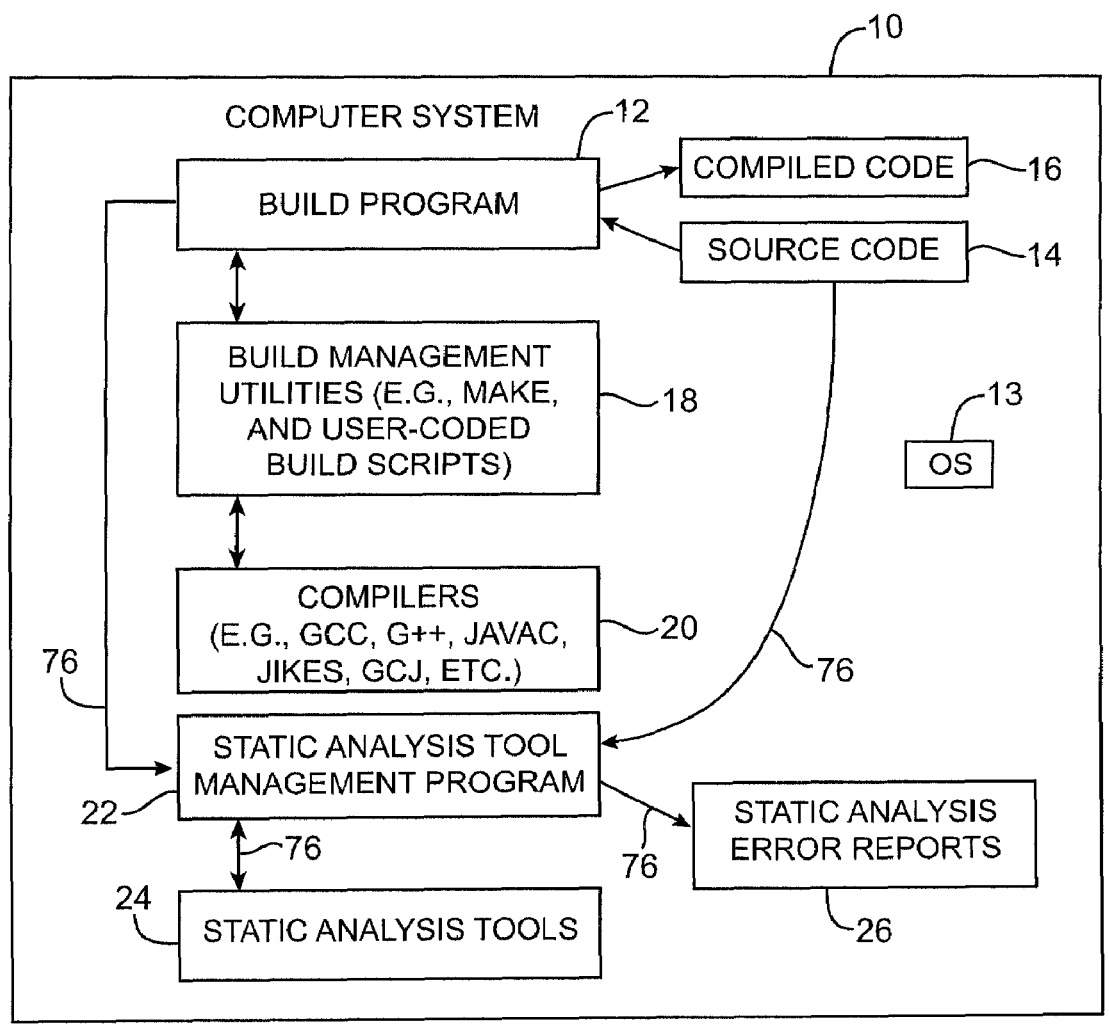
FIG. 1 is a diagram of an illustrative computer system in which source code may be compiled in a complex build environment and in which software debugging tools such as static analysis debugging tools may be used in accordance with the present invention.

An illustrative computer system 10 in accordance with the present invention is shown in FIG. 1. System 10 may have an operating system 13 and may include any suitable number of processors such as microprocessors, digital signal processors, processors based on application-specific integrated circuits or any other suitable components for running software. System 10 may be based on a single computer (e.g., a mainframe, workstation, or personal computer) or may be based on multiple computers. Multiple computers may be interconnected by a communications network such as the Internet, a local area network (LAN), a wide area network (WAN), other suitable networks, or combinations of such networks. System 10 may include storage media (e.g., hard disk drives, random-access memory, read-only memory, removable media such as compact disks, digital video disks, flash memory, and tape, etc.). The storage may be used when storing data and when storing and running the software of system 10.

Software developers use system 10 to develop software. The software that is developed may be compiled into executable code. The executable code may be run on system 10 and other suitable platforms. The executable code is run by the software developers during the development process. Once the software has been tested, the software may be run by end users on their own equipment.

Modern software is typically developed using a modular approach. Teams of programmers may work on different modules or portions of the software. Some software components may be purchased from third-party software vendors.

Because many different programmers and organizations may be involved in the software development process, modern software development environments can become complex. For example, different portions of the source code of a typical software project may be stored on different computers and in different computer directories. Different software languages may be used to write different portions of the code.

A number of different compilers may be used. For example, when it is necessary to compile source code that was written in the programming language C++ into executable code, an appropriate C++ compiler may be used. Source code in the Java computer language may be compiled using a compiler such as the Jikes™ compiler. Moreover, different compilers may be used to compile different portions of the source code, even when all of this code is written in the same language. This is because different compilers have different strengths and weaknesses. For example, different compilers may produce executable code that runs on computer systems with different microprocessors.

During the software development process, it is necessary to compile the code being developed to produce executable code for testing. Because the process of identifying the necessary source code files and establishing appropriate directory locations, compiler names, and other compilation settings involves many steps, software developers typically automate this process using a build program 12. The build program 12 may include one or more parts, but is referred to as a single "program" herein for clarity.

The build program 12 is used to convert source code 14 into compiled (executable) code 16. The source code 14 may be written in any suitable language or languages such as C, C++, Java, etc. The actual compilation process involves the use of compilers 20 that are invoked by the build program. Typical compilers that may be used include C compilers such as GCC and G++ and Java compilers such as JavaC, Jikes, and GCJ.

Build management utilities 18 may be used during the build process. One popular build management utility is the "Make" program. Make is available commercially in different versions from vendors such as Hewlett Packard. The Make program helps software developers to set directory environments and other compiler settings and to invoke the appropriate compilers needed to compile a given portion of source code.

Software developers may also write their own build management utilities. For example, a software developer may write a custom build management utility in the Perl scripting language. The build management utilities 18 are used to set compilation settings and to invoke the compilers 20 that compile the source code.

When the software being developed for a given project is not too complex, it may be feasible to use a single build management utility (e.g., a single copy of Make) to perform all of the build functions of the build program 12. In complex modern software development environments, a multi-layer approach is more often used in which build program 12 invokes multiple build management utilities 18 and build management utilities 18 in turn invoke multiple compilers 20. The use of the build management utilities 18 and the use of compilers 20 to compile source code 14 into compiled code 16 may be considered to be part of the operation of build program 12.

Static analysis debugging tools 24 may be used to perform static software code error analysis. Tools 24 may be any suitable static analysis tools. An example of a typical static analysis tool is the "Lint" program used for checking C-language programs. Static analysis tools 24 may be used to detect syntax errors, functions without return values, variables that have been declared but not used, inadvisable automatic type conversions, global-variable inconsistencies, problems associated with using modules (e.g., missing or invalid modules or input/export mismatches), or may be used to perform any other suitable static analysis on source code 14.

In general, a number of different static analysis tools 24 may be used. For example, a different static analysis tool may be used for analyzing C-language source code than is used to analyze C++ source code. Still another static analysis tool may be used to analyze Java-language source code.

The static analysis tools may include tools of different types. For example, the static analysis tools 24 may include tools that perform substantially different types of static analysis and that produce substantially different types of error reports. One static analysis tool may be used primarily for analysis of problems associated with calling external software modules. Another static analysis tool may be used primarily for analyzing problems associated with memory accesses.

The static analysis tools may also include multiple versions of the same tool (e.g., a C version of a given tool, a C++ version of the given tool, and a Java version of the given tool). If desired, static analysis tools 24 may include different types of tools and different versions.

The results of the analysis performed by the static analysis tools 24 may be provided in the form of static analysis error reports 26 or any other suitable analysis result format. Analysis reports 26 may include graphs and charts, lists of possible errors, lists of inadvisable statements or syntaxes, statistics on different types of problems or potential problems with the source code, or any other suitable analysis reporting format that identifies problems and possible problems in source code 14 obtained using the principles of static analysis. The output of the static analysis tools 24 may be printed by system 10, displayed on a display in system 10, or stored in storage in system 10 (e.g., in a database).

In order to check the source code 14 thoroughly, the static analysis tools may be run on most or all of the source code 14. By using the static analysis tools 24 thoroughly, the greatest number of errors and programming problems in source code 14 may be detected.

To avoid the burden of requiring software developers to attempt to manually set up and invoke appropriate static analysis tools, the static analysis tool set-up and invocation process may be automated (i.e., set up to be run without significant user intervention). With an automated set-up and invocation arrangement, new static analysis tools 24 can be deployed on system 10 almost immediately. Possible errors that might arise if a software developer were to attempt to manually invoke the static analysis tools can be minimized.

Several different techniques may be used to automatically set up the appropriate compilation settings and invoke the appropriate static analysis tools. With all of these approaches, it is possible for information about the build process that takes place when build program 12 is run to be used to properly invoke the static analysis tools 24.

With one suitable approach, the software developer or other user may run the build program. The static analysis tool management program 22 may monitor the build process. The static analysis tool management program 22 may then use the output of the build process to properly set up and invoke the appropriate static analysis tools 24 to perform a thorough static analysis on source code 14 on system 10.

Figure 2:
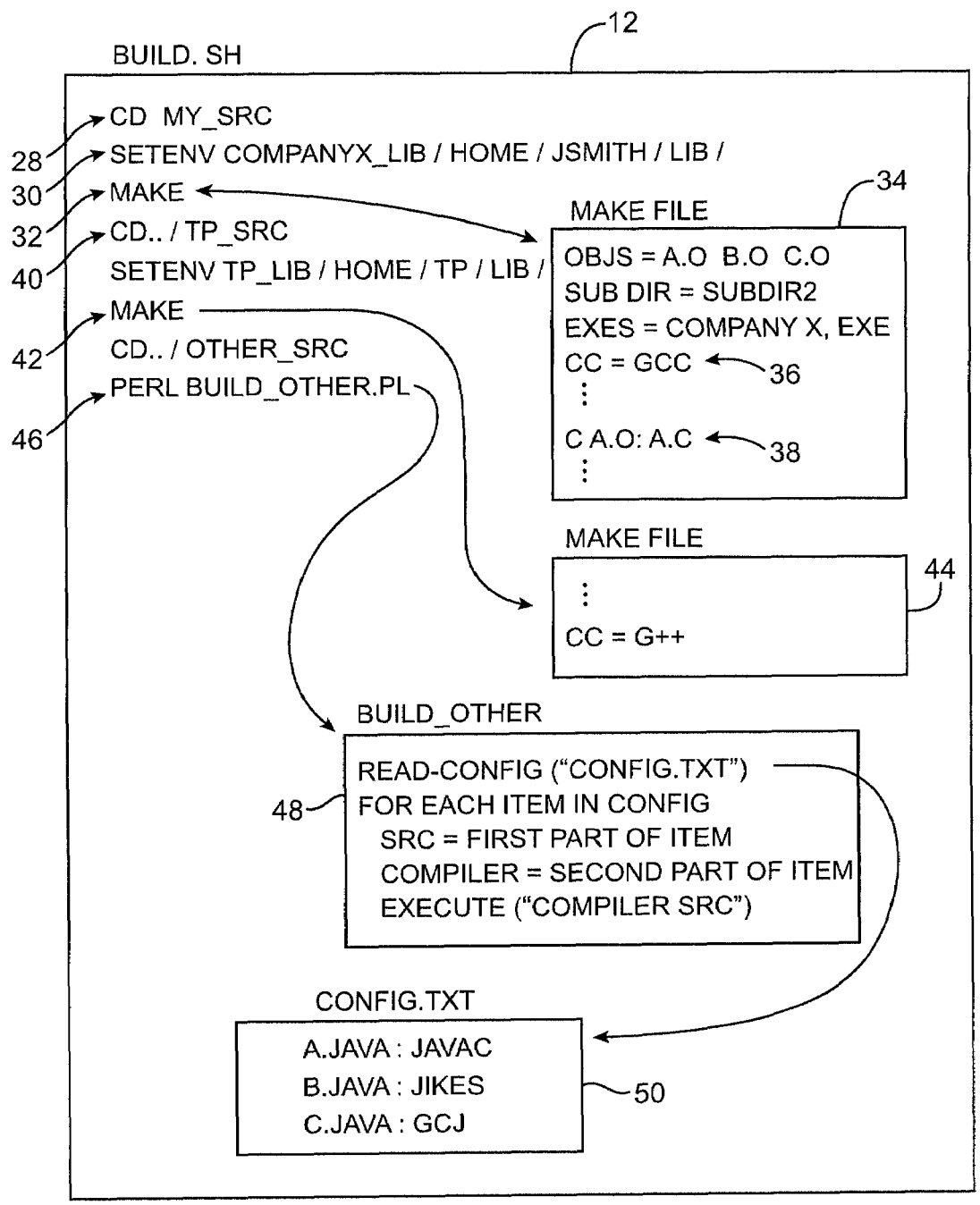
FIG. 2 is a diagram of an illustrative build process from which information may be used for invoking appropriate static analysis tools in accordance with the present invention.

An illustrative build program 12 is shown in FIG. 2. The program (called build.sh in this example) may be written in a scripting language such as Perl or any other suitable programming language. The build program 12 may be constructed in one or more parts. Build programs that have more than one part may be run sequentially or concurrently. For clarity, a one-part program arrangement is shown in the example of FIG. 2.

Program 12 includes commands that direct computer system 10 to change directories. For example, one part of the build process may involve compiling source code (e.g., a file A.C, in the directory my_src. The build program 12 may include commands such as command 28 that direct computer system 10 to change the current directory to a desired directory ("my_src" in this example). The build program 12 may also include commands such as "setenv" command 30 that establish library locations and other compiler set-up parameters. In the example of FIG. 2, the setenv command 30 assigns the value/home/jsmith/lib to the variable companyx_lib.

The build program may make calls to build management utilities 18, such as the Make program call 32. This type of command invokes the appropriate build management utility (i.e., the Make program in this example). The Make program may use one or more associated files (e.g., Make file 34) to properly set up the compilation settings to be used to compile the source code of interest.

Make file 34 may contain information on the compiler or compilers to be used. For example, Make file 34 may contain an entry such as entry 36 that identifies the compiler that is to be used as "GCC" (an illustrative C compiler). Make file 34 may also contain information 38 that identifies which source code files are to be compiled (source code file A.C in this example).

After the Make program has run and the first set of source files has been compiled, the build program can continue the build process. For example, the build program can use another change-directory command such as command 40 to change the directory to that needed to compile another portion of source code. Another set of source code files may be compiled by reinvoking the Make program with Make call 42. When invoked for the second time, the Make program may use a different Make file 44 to compile more source code. If desired, there may be multiple calls to build management utilities 18 and more than one build management utility may be invoked.

Moreover, the build program 12 may invoke user-written build management utilities. In the example of FIG. 2, build program 12 invokes a Perl program 48 (called "build_other.pl") using command 46. The build_other build management utility may perform particular build functions that are not easily handled in commercially-available build management utilities. The build management utility may also be used because the software developer created the build management utility and does not want to change this arrangement.

The build_other build management utility of FIG. 2 reads a configuration file 50 to determine which source code files (e.g., A.JAVA, B.JAVA, and C.JAVA) are to be compiled. The configuration file 50 may contain information on which compilers are to be used. In the example of FIG. 2, the config.txt file 10 contains entries that, when executed using the routine in the build_other program 48 specify how the A.JAVA source code is to be compiled using the JAVAC compiler, the B.JAVA source code is to be compiled using the JIKES compiler, and the C.JAVA source code is to be compiled using the GCJ compiler.

The build program 12 of FIG. 2 is merely illustrative. Any suitable number of build management utility programs 18 (both commercially available and custom-written by the user) may be invoked. The build management program 12, utilities 18, and the configuration information associated with the build program and utilities identify which source code is to be compiled and establish which compilers are to be used to compile each source code file and other compilation options.

Figure 3:
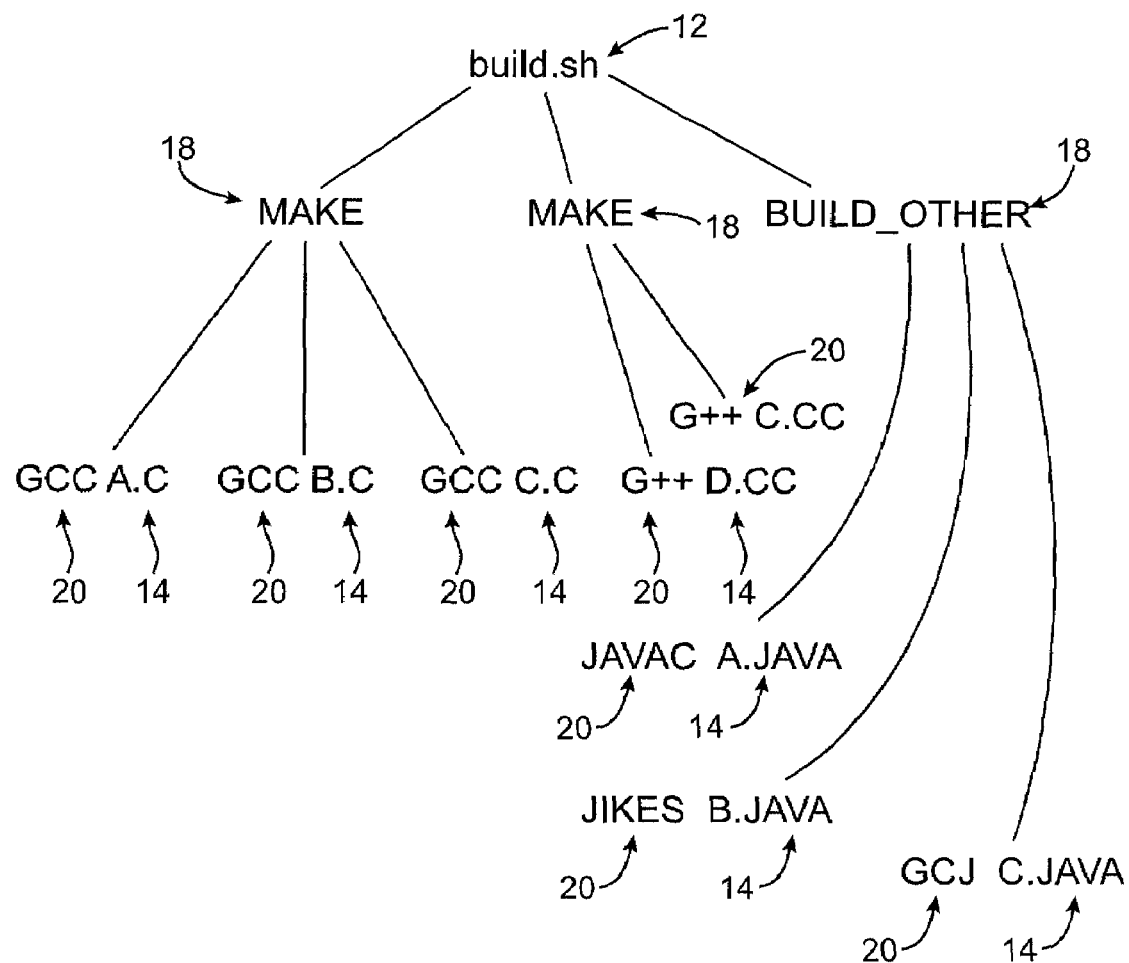
FIG. 3 is a tree-structure diagram showing the relationship of the build process of FIG. 2 to its components.

A graphical representation of the build process is shown in FIG. 3. As shown in FIG. 3, build program 12 invokes build management utilities 18, which invoke compilers 20, each of which compiles a respective source code file 14.

Figure 4:
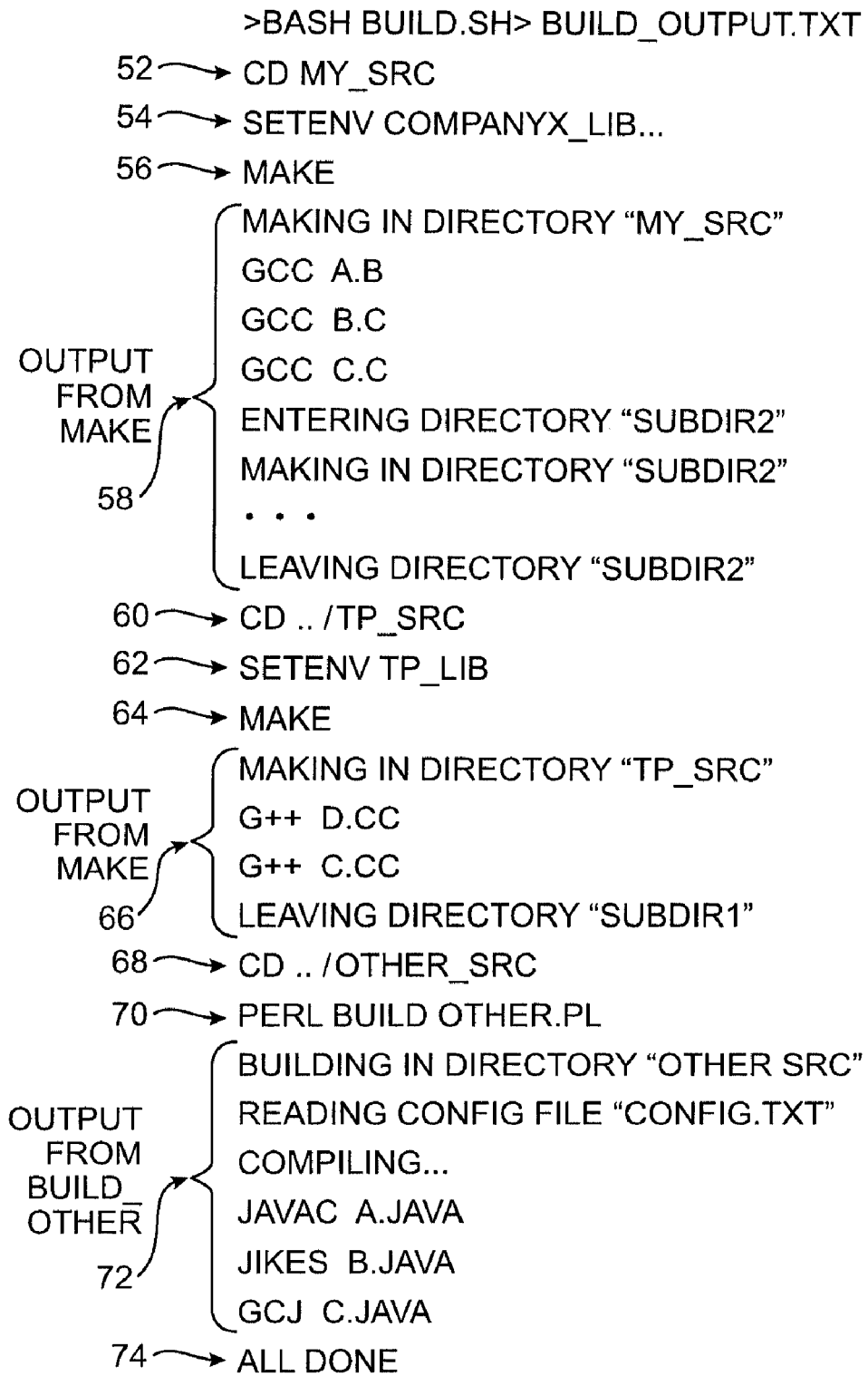
FIG. 4 is a diagram listing illustrative build process output in accordance with the present invention.

The output of the illustrative build program build.sh when the build program is run on computer system 10 is shown in FIG. 4. The build program output may be printed, may be displayed on a display screen, may be directed to a file, or may be displayed and stored using any other suitable approach. In the example of FIG. 4, the output of build.sh is being directed to the file build_output.txt.

The program build.sh may be run using any suitable approach. In the example of FIG. 4, the program build.sh is a shell script being run by the shell program bash.exe. This is merely an illustrative arrangement. The build program 12 may be run on computer system 10 using any suitable approach.

The build program output of FIG. 4 produces output lines 52 and 54 that confirm that the desired change directory and set environment commands have been performed. Output line 56 indicates that a build management utility (the "Make" program in this example) has been invoked. Output lines 58 are the result of the operation of the build management utility program. Output lines 58 contain confirmation of the location of the build management program's execution (e.g., directory subdir2), confirmation of the execution of each compiler that is called, and information on the associated source code files being compiled.

The process repeats for each build management utility that is invoked. Lines 60 and 62 confirm that another directory change has been made and another setenv command has been executed. Line 64 indicates that the Make program has been invoked again. Lines 66 indicate the steps performed during this invocation of Make.

After the Make program is finished, the build program outputs line 68 to indicate that another directory change has been performed. The invocation of the build_other build management utility is then confirmed at line 70. Lines 72 result from the running of the build_other build management utility.

Build program output line 74 confirms that the build process is complete.

As shown in FIG. 4, the output of the build program contains information that can be used in identifying which static analysis tools 24 are to be used in debugging the source code 14. Static analysis may be performed on the source code 14 to produce static analysis results 26 by using static analysis tool management program 22 to invoke static analysis tools 24 based on the output provided from the build program, as shown by arrows 76 in FIG. 1.

For example, a static analysis tool 24 called SWAT_C++ may be used to analyze C++ code compiled with compiler G++ and a static analysis tool called SWAT_C may be used to analyze C code compiled with compiler GCC. The static analysis tools are language-specific, so they must be matched with appropriate source files. In this type of environment, the information in output lines 58 that associates source files A.C, B.C, and C.C with compiler GCC and the information in output lines 66 that associates source files D.CC and C.CC with compiler G++ can be used by the static analysis tool management program 22. In particular, the static analysis tool management program 22 can use the information in output lines 66 to run SWAT_C++ on C.CC and D.CC and can use the information in output lines 58 to run the static analysis tool SWAT_C on source code A.C., B.C, and C.C.

Figure 5:
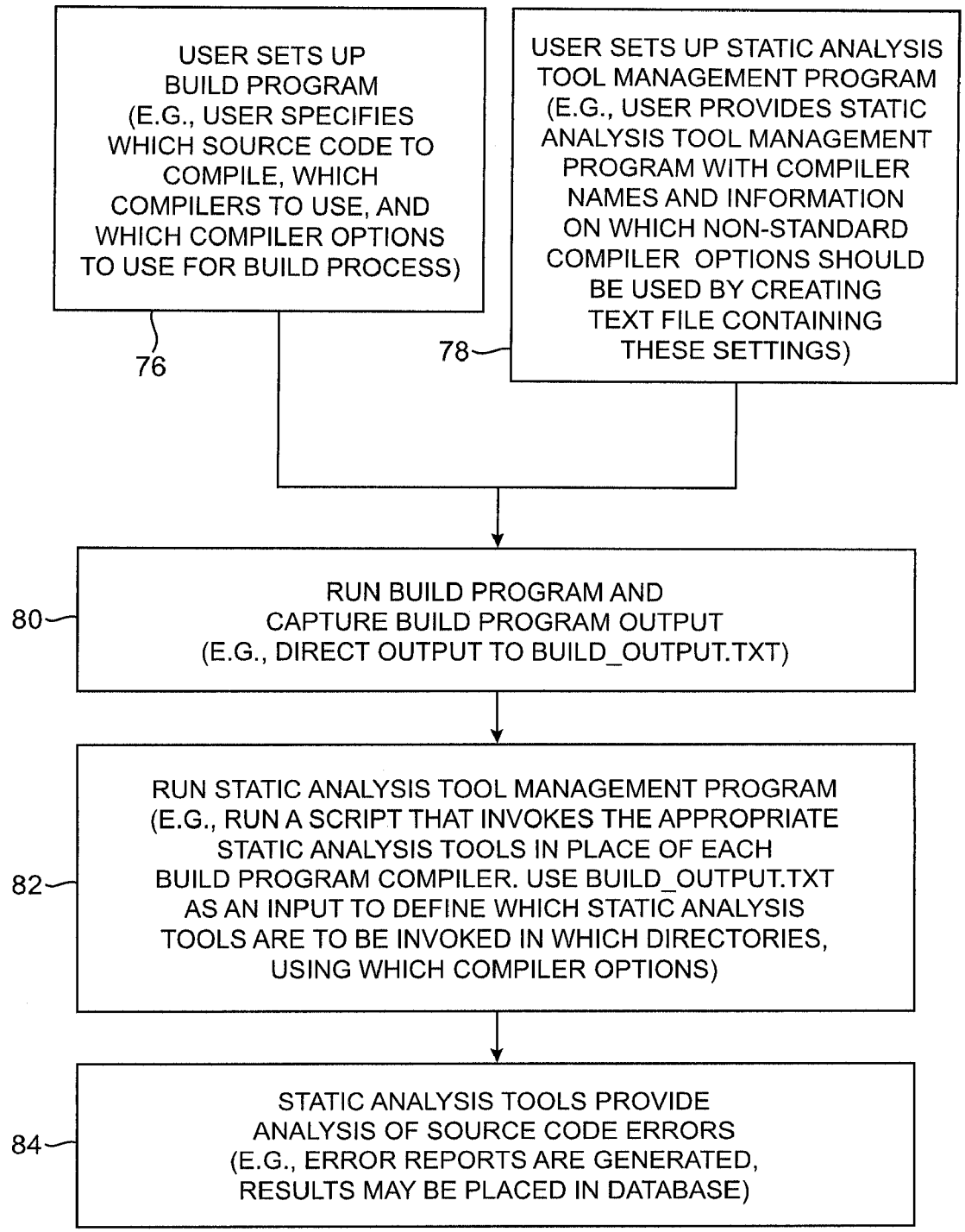
FIG. 5 is a flow chart of illustrative steps involved in using a build process to build executable software and in using static analysis tools to perform error analysis on the source code from which the executable software is built in accordance with the present invention.

Illustrative steps involved in using computer system 10 to perform static analysis on source code 14 to produce static analysis error reports and other static analysis results are shown in FIG. 5. At step 76, the user sets up the build process. For example, the software development team at an organization writes the build program (e.g., a build program or programs such as build.sh). The build program, build management utilities, and the configuration files associated with the build program and build management utilities specify which source code is to be compiled during the build process, specify which compilers are to be used to compile which source code, and specify a number of compilation options. The compilation options (which are sometimes specified on a compiler command line) may include options such as which architecture to compile for, how much to optimize the executable code (optimization level), what types of warnings to produce (error message level), and other suitable options.

At step 78, the user may set up the static analysis tool management program 22. For example, the user may provide the static analysis management tool program 22 with information on which compiler names are used to compile the user's source code during a normal build. The user may explicitly type in this information in response to an on-screen query from the static analysis management tool program 22 running on system 10 or may otherwise provide this information to program 22 (e.g., in a configuration file). The static analysis tool management program 22 accepts the setup information as an input.

Every compiler has different available options, some of which may be fairly obscure proprietary options. Because the static analysis tools 24 may not recognize these options, the user may be provided with an opportunity at step 78 (on-screen or through a configuration file such as a configuration text file or other arrangement) to direct the static analysis tool management program 22 to ignore such nonstandard options. By informing the static analysis tool management program 22 of which options should be ignored, the user may prevent the static analysis tools 24 from experiencing difficulties in analyzing the source code properly. Moreover, the static analysis tools 24 may use (or even require) additional options that are not recognized by every compiler. For example, the static analysis tools 24 may require that a compiler option that suppresses warnings be used (even though this option is not normally used during regular compilation operations). The user may be provided with the opportunity at step 78 to direct the static analysis tool management program 22 to provide such additional options to the static analysis tools 24.

After the build program has been set up at step 76 and after the static analysis tool management program 22 has been set up by the user at step 78, the build program may be run on system 10 at step 80. The user may start the build program by typing in the build program name after a suitable shell program name, as described in connection with FIG. 3. As the build program is run, system 10 can capture the build program output. With one suitable approach, the build program output may be captured by directing the build program output to a text file (e.g., build_output.txt), as described in connection with FIG. 3.

The build program output may be used in determining how to analyze the source code using the static analysis tools 24. For example, in an environment in which the C++ compiler is used to compile source code file A.C, the appropriate static analysis tool to use to analyze the A.C source code might have the name SWAT_C++. The build program output contains information that associates A.C with the C++ compiler (as an example).

At step 82, the static analysis tool management program 22 may be run on computer system 10. For example, the user can run a script that invokes each of the static analysis tools in place of each build program compiler. The script can use the build_output.txt file that was created at step 80 as an input. The information in the build_output.txt output file from the build program may be used to define which static analysis tools are to be substituted for each compiler. For example, this information may be used to specify that the static analysis tool SWAT_C++ (i.e., a static analysis tool that has been developed to detect errors and potential problems in C++ code using the principles of static analysis) is to be substituted for the C++ language compiler G++. The build program output may also specify that the static analysis tool SWAT_CC is to be run on source code files that would be compiled using the GCC compiler during the normal build process. In addition, the build output.txt file that was created at step 80 may be used to specify the directories that contain the source code 14 that will be analyzed by the static analysis tools 24.

Some compilers may share a single static analysis tool. For example, several Java compilers (e.g., JAVAC, JIKES, and GCJ) may be used to compile different source code files. However, only a single static analysis tool (e.g., a static analysis tool called SWAT_JAVA that is designed for analyzing errors in Java code) may be used to analyze each of these different files. In this situation, the static analysis tool management program 22 can match the same Java static analysis tool with each of the different Java source code files based on the build program output. These are merely illustrative examples of information that static analysis tool management program 22 can extract from the build process output (e.g., the build.output.txt file) and that the static analysis tool management program 22 can use to properly invoke the static analysis tools 24 during the static analysis process. Any suitable information from the build program output may be used by program 22 if desired.

At step 84, the static analysis tool management program 22 that has been run (and which has invoked the appropriate static analysis software debugging tools 24 for analyzing source code 14), may provide the results of the static analysis performed on the source code 14 using the static analysis tools 24). For example, the static analysis tool management program 22 may provide error reports or other suitable analysis results. The static analysis results may be stored in a database to facilitate access to the results by the user or may be displayed or printed for the user of the system 10.

With the approach of FIG. 5, the static analysis tool management program 22 may be used to automate the static analysis process.

With another suitable approach, the existing search paths on the computer system 10 may be modified to include a new local directory in which the static analysis tools 24 are placed. By renaming the static analysis tools 24 so that they have the same names as the compilers 20, the static analysis tools 24 can be invoked in place of the compilers 20 when the build program 12 is run.

Figure 6:
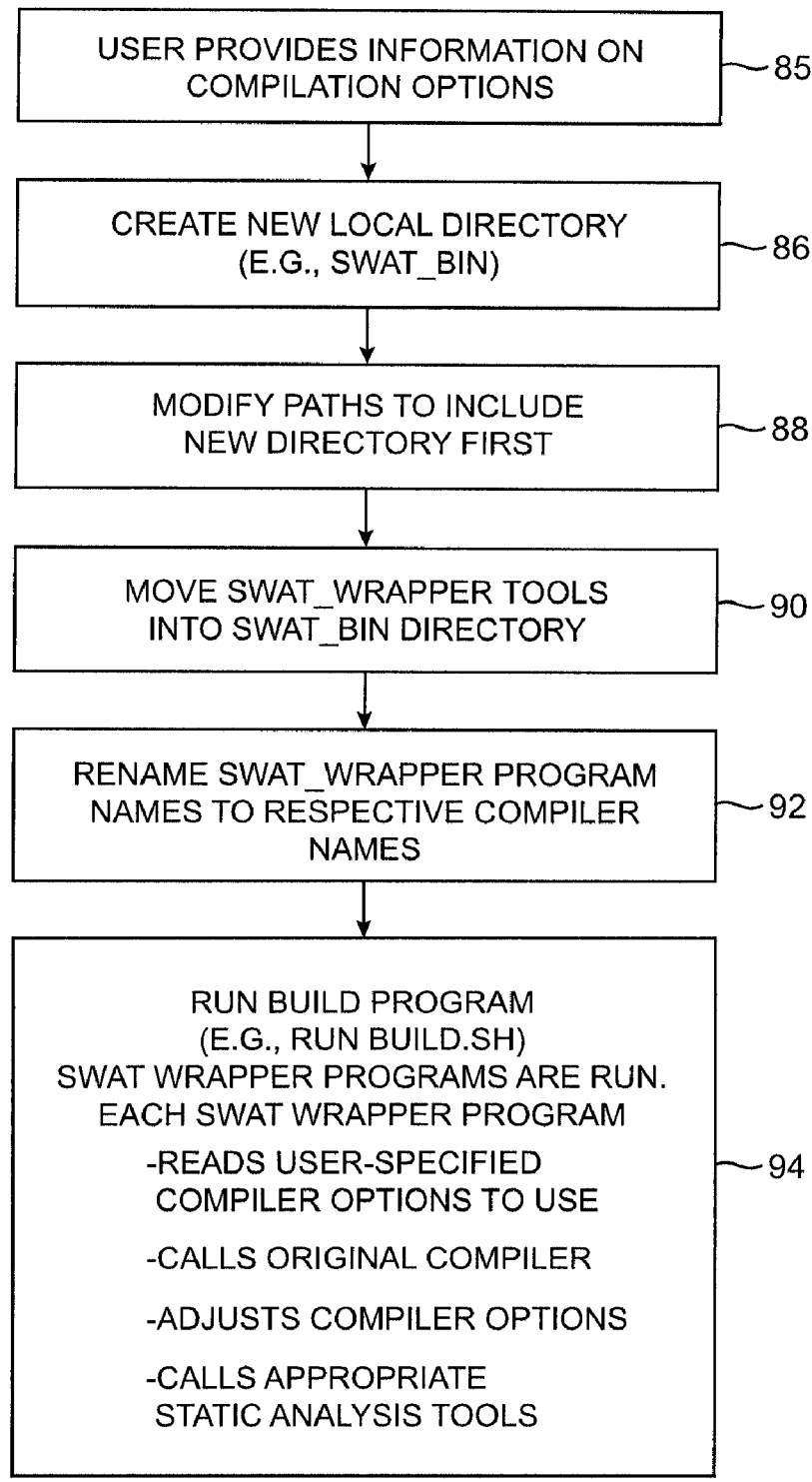
FIG. 6 is a flow chart of illustrative steps involved with invoking static analysis tools using modified paths and static analysis tools renamed as compilers in accordance with the present invention.

Steps involved in using this static analysis approach are shown in FIG. 6. At step 85, the user may provide information on which compiler options are to be used by the static analysis tools 24 during the static analysis procedure. Some compiler options are to be ignored by the static analysis tools 24 during the static analysis procedure because they would not be understood by the static analysis tools 24. Other additional compiler option settings (arguments) may be required (or suggested). As an example, an additional compiler option that suppresses all warnings may be added. By using this additional compiler option during the static analysis procedure, warnings (which might normally be displayed during normal compiler operations) will be hidden from view, so as not to distract the user and so as to reduce the size of the output that is generated. The user may provide the information on which compiler options to use (i.e., which options to ignore and which options to add) by creating a configuration text file on system 10 or using any other suitable technique.

At step 86, a new directory is created on computer system 10. For example, a new directory called "SWAT_BIN" may be created.

At step 88, the directory search paths on the computer system 10 may be modified (e.g., by modifying the "PATH" environment variable or other suitable commands) so that the resulting modified search paths include the new directory (i.e., SWAT_BIN in this example) before they include the directories containing the compilers 20. The new directory is placed first in the search path, so that it will be searched before the directories containing the compilers 20.

At step 90, special "wrapper" programs that correspond to the static analysis tools 24 may be placed in the newly-created directory (SWAT_BIN). For example, a wrapper program that is based on the C++ static analysis tool called SWAT_C++ may be moved into SWAT_BIN. This wrapper program may be called SWAT_WRAPPER_C++. A wrapper program called SWAT_WRAPPER_C that is based on the C-language static analysis tool called SWAT_C may be moved into SWAT_BIN. A wrapper program called SWAT_WRAPPER_JAVA that is based on the Java language static analysis tool SWAT_JAVA may also be moved into SWAT_BIN. The purpose of the "wrapper" programs is to perform functions such as reading which compiler options to ignore or add (e.g., from a user-generated configuration text file) that may not be normally performed by the static analysis tools SWAT_C++, SWAT_C, and SWAT_JAVA. Because the wrapper programs invoke these static analysis tools and because the wrapper program functions may be incorporated into the static analysis tools themselves if desired, the wrapper programs may be referred to herein as either "static analysis tools" or "static analysis tool wrapper programs."

Once the static analysis tool wrapper programs have been moved into the new directory, they may be renamed at step 92, so that their new names match the names of respective compilers 20. For example, the name of the SWAT_WRAPPER_C++ program, which invokes a static analysis tool SWAT_C++ that is suitable for performing static analysis on C++ source code that is normally complied using a compiler called G++, may be changed to G++. Similarly, the name of the SWAT_WRAPPER_C wrapper program, which invokes a static analysis tool SWAT_C that is suitable for performing static analysis on C-language source code that is normally compiled using a compiler called GCC, may be changed to GCC. The SWAT_WRAPPER_JAVA program may be used to invoke a tool called SWAT_JAVA, which is a static analysis tool suitable for performing static analysis on Java-language source code that is normally compiled using several different Java compilers (in this example). These compilers (JAVAC, JIKES, and GCJ) all have different characteristics, but (in this example) a single Java-language static analysis tool may be used to perform static analysis on the source code that is compiled using all of these different compilers. Accordingly, three copies of the SWAT_WRAPPER_JAVA program may be placed in the SWAT_BIN directory at step 90. During step 92, one may be renamed JAVAC, one may be renamed JIKES, and one may be renamed GCJ.

At step 94, the build program 12 may be run. Because the search path on the computer system 10 has been modified (at step 88) and because the static analysis tool names (wrapper program names) have been changed to respective compiler names (at step 92), the build program will invoke the appropriate static analysis tools 24.

During step 94, the build program runs the wrapper programs. Each wrapper program may read the user-specified compilation options to use (e.g., which compiler options should be ignored and which additional compiler options are to be added). The wrapper programs may use the information provided at step 85 in determining which compiler options to use.

Each wrapper program may call the original compiler and adjust its arguments (options). Each wrapper program may then perform static analysis on an appropriate source code file by calling the appropriate static analysis tool using the information on the compiler options (arguments) and user-specified compiler options to use.

Because the compilers may be invoked by the wrapper programs at the same time as the tools 24, running the build program after the modifications of FIG. 6 have been performed may cause both the normal build process and the static analysis of source code 14 to be performed. As a result, the regular compiler output (i.e., the compiled code that is created during a normal build process) may be generated along with the static analysis error reports (or other suitable static analysis tool results) that are produced by the static analysis tools.

With the approach of FIG. 6, it is not necessary to use a static analysis tool management program 22 of the type described in connection with FIG. 1 to invoke the static analysis tools 24. Rather, changes to the computer system's path and changes to the names of the static analysis tools (i.e., the wrapper programs) are sufficient to properly invoke the necessary static analysis processes.

Another automated static analysis approach that works in complex software development environments involves the use of a trace program to monitor interactions between the build program and the operating system. The output of the trace program can be used to identify invocations of the compiler and substitute the static analysis tools 24 substituted for the compilers. The substitution may be performed as a separate step after the build program has completed, during the execution of the build program while the trace is being generated, or using any other suitable technique.

Figure 7:
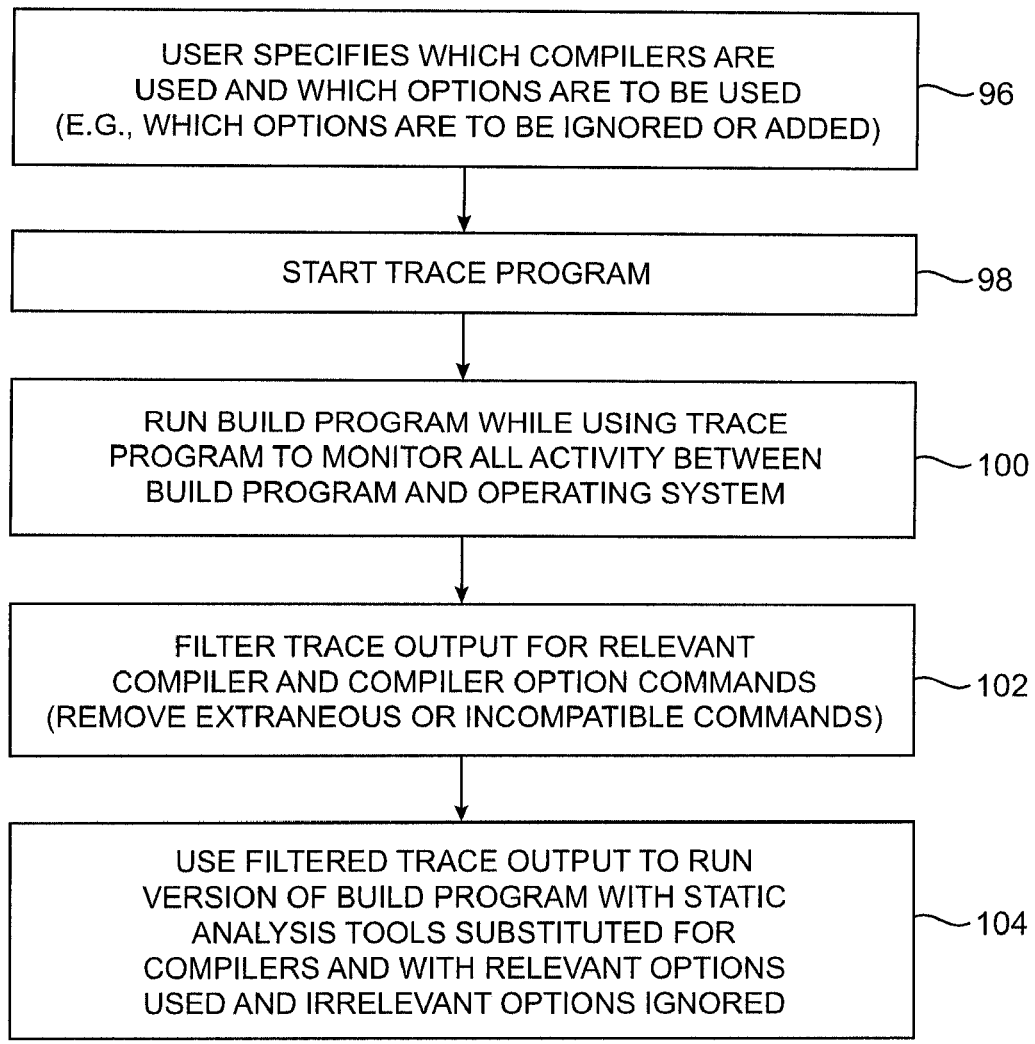
FIG. 7 is a flow chart of illustrative steps involved in using a monitoring program that monitors interactions between the build process and the operating system to determine how to automatically invoke static analysis debugging tools in accordance with the present invention.

Steps involved with using this approach to perform static analysis are shown in FIG. 7. At step 96, the user may (as with the other approaches) specify which compilation options are to be used. Certain compilation options may be ignored because they are proprietary or might otherwise not be recognized by the static analysis tools 24 and certain additional compilation options may be required (e.g., to suppress undesired warnings, etc.).

At step 98, the trace program may be run. The trace program is used for monitoring interactions between the operating system and the static analysis tools 24. The trace program may be an application program, may be part of the operating system on computer system 10, or may contain both application program and operating system components. One possible trace program that may be used is the utility "strace" that is available on many operating systems.

At step 100, the build program may be run while the trace program is active. The trace program may monitor the activity that takes place between the operating system on computer system 10 and the static analysis tools 24. By monitoring these interactions, the trace (or monitoring)

program may determine what compilation options are being used by the compilers as they are being invoked by the build program 12 and its associated build management utilities 18.

Some of the options being used by the build program and compilers may not be relevant for purposes of static analysis of code 14 or may not be understood by the static analysis programs. Accordingly, the output of the trace program monitoring process may be filtered at step 102. During the filtering process of step 102, commands that are relevant are retained, while extraneous commands and commands that are incompatible or not understood by the static analysis tools may be removed.

At step 104, a version of the build program may be run in which the static analysis tools 24 are substituted for the compilers. As the build program is run at step 104, the appropriate static analysis tools 24 are automatically substituted for the original compilers 20 and the appropriate options (supplied by the user at step 96 and determined during filtering step 102) are used by the static analysis tools 24.

With a standard trace program approach, the standard operating system trace program (e.g., the program "strace") may be used to capture interactions between the build program and the operating system. After filtering, this information may be used to invoke the static analysis tools.

With another suitable approach, operating system debugging commands are used by a custom trace or monitoring program to monitor activity between the build program and the operating system. The custom monitoring program can use the operating system debugging commands to launch the build program. Alternatively, the custom monitoring program can use the operating system debugging commands to make calls to operating system debugging functions while the trace program is running.

When the debugging commands are used to launch the build program, the build program may be launched in a special trace mode. Invoking the build program in this special trace mode will provide the custom trace program with notification and control when the build program or any of the programs started on behalf of the build program interact with the operating system.

The custom monitoring program may be invoked at step 98 of FIG. 7. During steps 100, 102, and 104, the build program is run and the custom monitoring program gathers information on the interactions between the operating system and the build program and uses this information to invoke the static analysis tools.

Yet another approach for performing static analysis on code 14 involves redefining operating system commands on computer system 10 so that appropriate static analysis tools 24 are automatically invoked in place of the compilers 20 that are normally invoked by the build program.

Figure 8:
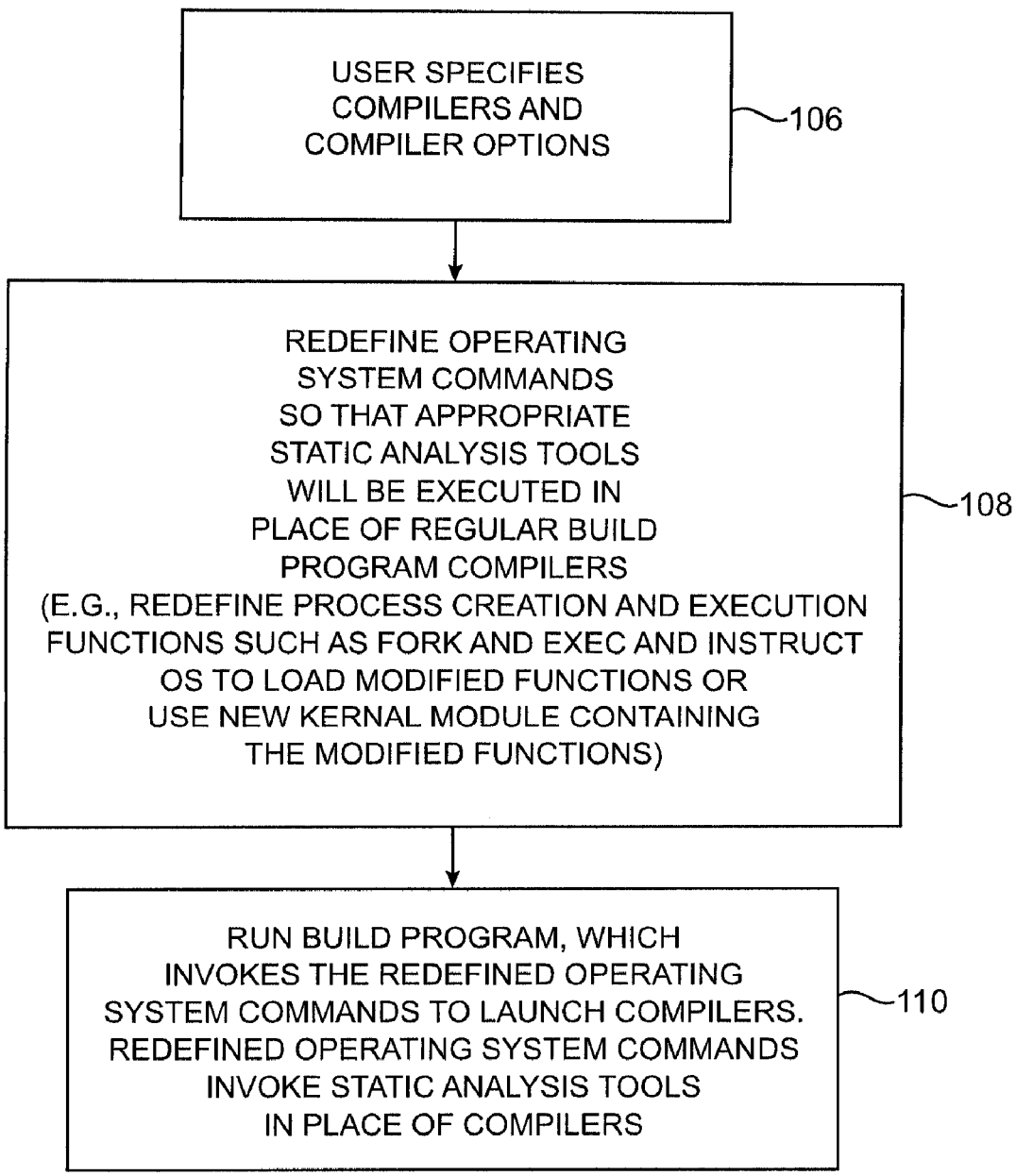
FIG. 8 is a flow chart of illustrative steps involved in invoking static analysis debugging tools by redefining operating system functions in accordance with the present invention.

Illustrative steps involved in using this approach are shown in FIG. 8. At step 106, the user specifies (as with the other approaches) which compilers are used in the system 10 and which compiler options are to be used (e.g., ignored or added). With the approach of FIG. 8 and the other approaches described above, the information identifying the compilers and compilation options may be gathered using an on-screen user interface to which the user responds by clicking on on-screen options, may be gathered by directing the user to create one or more configuration files (e.g., text files) using a document editor or other suitable interface, or may be gathered using any other suitable approach.

At step 108, the operating system 13 on computer system 10 may be modified so that the static analysis tools will be invoked in place of the compilers. Any suitable approach may be used to modify the operating system at step 108. For example, operating system process creation and execution commands such as Fork and Exec may be redefined by placing modified versions of these commands on computer system 10 and by instructing the operating system to load these modified commands. When the modified commands are used during the execution of the build program 12, the modified commands cause the appropriate static analysis tools 24 to be invoked in place of the original compilers 20. As another example, a new operating system kernel module that contains the modified operating system functions can be provided. The operating system 13 may use the new kernel module during operation so that the appropriate static analysis tools 24 are automatically invoked in place of the compilers 20 when the build program 12 is run.

At step 110, the build program 12 is run and, due to the changes in the operating system commands of step 108, the static analysis tools 24 are automatically invoked in place of the compilers 20. With this approach it is not necessary to create a static analysis tool management program 20 (as described in FIG. 1). The appropriate static analysis tools 24 are invoked through the modified operating system 13. Static analysis tools 24 run on the appropriate source code 14 and produce error reports or other suitable static analysis results 26.

The foregoing is merely illustrative of the principles of this invention and various modifications can be made by those skilled in the art without departing from the scope and spirit of the invention.

What is claimed is:

1. A method for using static analysis tools on a computer system to perform error analysis on source code files, comprising:
   running a build program on the computer system to invoke compilers on the computer system that compile the source code files into executable code, wherein running the build program produces a build program output; and
   running a static analysis tool management program on the computer system to invoke the static analysis tools and produce corresponding static error analysis results, wherein the static analysis tool management program accepts the source code and the build program output as inputs.

2. The method defined in claim 1 further comprising directing the build program output to a file that is used as an input by the static analysis tool management program.

3. The method defined in claim 1 further comprising directing the build program output to a file that is used as an input by the static analysis tool management program, wherein the file contains information on which static analysis tools to substitute for each compiler when the static analysis tools are invoked.

4. The method defined in claim 1 further comprising providing a user with an opportunity to specify for the static analysis tool management program which compiler options should be ignored by the static analysis tools when performing static analysis on the source code.

5. The method defined in claim 1 further comprising providing a user with an opportunity to specify for the static analysis tool management program which additional compiler options are required by the static analysis tools when performing static analysis on the source code.

6. The method defined in claim 1 further comprising invoking a plurality of build management utilities with the build program as the build program is run, wherein the build program output includes output from the build management utilities.

7. A method for using static analysis tools on a computer system to perform error analysis on source code files that may be compiled on the computer system using compilers having corresponding compiler names that are invoked using a build program during a build process, comprising:
creating a new directory on the computer system;
modifying a search path on the computer system so that the new directory is included first in the search path;
placing the static analysis tools into the new directory, wherein the static analysis tools in the new directory are given names matching the compiler names; and
running the build program so that the static analysis tools with the names matching the compiler names are invoked.

8. The method defined in claim 7 comprising:
obtaining information from a user on compilation options for the compilers; and
using the information on the compilation options when invoking the static analysis tools by running the build program.

9. The method defined in claim 7 wherein running the build program comprises making calls to the compiler names.

10. The method defined in claim 7 wherein running the build program invokes both the compilers and the static analysis tools.

11. A method for using static analysis tools on a computer system to perform error analysis on source code files that may be compiled on the computer system using compilers that are invoked using a build program during a build process, wherein the computer system has an operating system, the method comprising:
running the build program on the computer system;
running a monitoring program on the computer system while the build program is running to compile the source code files, wherein the monitoring program monitors activity between the build program and the operating system; and
using output from the monitoring program to run the build program with the static analysis tools substituted for the compilers so that the static analysis tools perform static error analysis on the source code files.

12. The method defined in claim 11 further comprising gathering information from a user as to which compilers are used during the build process and which compilation options are to be used by the static analysis tools.

13. The method defined in claim 11 further comprising filtering the output from the monitoring program to remove compiler option commands.

14. The method defined in claim 11 wherein running the monitoring program comprises running a custom monitoring program that uses operating system debugging commands to monitor the activity between the build program and the operating system.

15. A method for using static analysis tools on a computer system to perform error analysis on source code files that may be compiled on the computer system using compilers that are invoked using a build program during a build process, wherein the computer system has an operating system comprising:
redefining operating system commands in the operating system; and
running the build program on the computer system, wherein the redefined operating system commands cause the build program to invoke the static analysis tools in place of the compilers so that the error analysis on the source code files is performed.

16. The method defined in claim 15 further comprising using user-specified information on the compilers and compiler options during invocation of the static analysis tools.

17. The method defined in claim 15 wherein redefining the operating system commands comprises redefining operating system process creation and execution commands by placing modified versions of the operating system creation and execution commands on the computer system and by instructing the operating system to load the modified versions of the operating system process creation and execution commands.

18. The method defined in claim 15 wherein redefining the operating system commands comprises using a new kernel module containing modified functions.

* * * * *